(12) United States Patent
Jiang et al.

(10) Patent No.: US 11,216,192 B2
(45) Date of Patent: *Jan. 4, 2022

(54) MEMORY PROTECTIVE APPARATUS FOR INDIRECT ACCESS MEMORY CONTROLLER

(71) Applicant: C-SKY Microsystems Co., Ltd., Zhejiang (CN)

(72) Inventors: Peng Jiang, Hangzhou (CN); Jie Wang, Hangzhou (CN); Huanhuan Huang, Hangzhou (CN); Youfei Wu, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 131 days.

This patent is subject to a terminal disclaimer.

(21) Appl. No.: 16/479,532

(22) PCT Filed: Dec. 14, 2018

(86) PCT No.: PCT/CN2018/121184
§ 371 (c)(1),
(2) Date: Jul. 19, 2019

(87) PCT Pub. No.: WO2019/114820
PCT Pub. Date: Jun. 20, 2019

(65) Prior Publication Data
US 2019/0361616 A1    Nov. 28, 2019

(30) Foreign Application Priority Data
Dec. 15, 2017  (CN) .................... 201711344559.6

(51) Int. Cl.
*G06F 3/06*     (2006.01)
*G06F 13/36*    (2006.01)
*G06F 21/78*    (2013.01)

(52) U.S. Cl.
CPC .......... *G06F 3/0622* (2013.01); *G06F 3/0653* (2013.01); *G06F 3/0673* (2013.01);
(Continued)

(58) Field of Classification Search
CPC .... G06F 3/0622; G06F 3/0653; G06F 3/0673; G06F 13/36; G06F 21/78; G06F 2213/16;
(Continued)

(56) References Cited

U.S. PATENT DOCUMENTS 7,055,038 B2    5/2006  Porter et al.
7,383,584 B2    6/2008  Strongin et al.
(Continued)

FOREIGN PATENT DOCUMENTS

CN          101017461        8/2007
CN          102200952        9/2011
(Continued)

OTHER PUBLICATIONS

Extended European Search Report in European Application No. 18888559.4, dated Nov. 19, 2020 (9 pgs.).
(Continued)

*Primary Examiner* — Tasnima Matin
(74) *Attorney, Agent, or Firm* — Finnegan, Henderson, Farabow, Garrett & Dunner, LLP

(57) ABSTRACT

Embodiments of the present disclosure provide a protective apparatus for an indirect access memory controller. The apparatus can include: a bus monitoring unit configured to monitor a bus address and detect an operation type of a bus accessing the indirect access memory controller, update a corresponding window register if the operation type is a window register operation, initiate permission authentication if the operation type is a register controlling operation, and perform list entry configuration if the operation type is a permission list configuration operation; a window register
(Continued)

unit configured to store operation addresses of different access types; a permission list unit configured to partition a memory space into several virtual memory protection areas, and independently set a access permission attribute for each memory area; and an unauthorized operation processing unit configured to process a subsequent operation performed when a permission violating access occurs. Embodiments of the present disclosure can implement security protection for this type of memory by merely adding the protective apparatus between a bus and an indirect access memory controller, and a security function can be added to an original memory control module without modifying the indirect access memory controller.

13 Claims, 3 Drawing Sheets

(52) U.S. Cl.
CPC .............. *G06F 13/36* (2013.01); *G06F 21/78* (2013.01); *G06F 2213/16* (2013.01)
(58) Field of Classification Search
CPC ......... G06F 2212/1052; G06F 12/1483; G06F 2221/2141; G06F 15/7807
See application file for complete search history.

(56) References Cited

U.S. PATENT DOCUMENTS

| | | | | |
|---|---|---|---|---|
| 8,925,041 | B2* | 12/2014 | Bulumulla | G06F 21/6218 726/4 |
| 2007/0234433 | A1* | 10/2007 | Yeem | G06F 21/572 726/29 |
| 2012/0079590 | A1 | 3/2012 | Sastry et al. | |
| 2013/0205385 | A1* | 8/2013 | Roesner | G06F 21/6245 726/17 |
| 2016/0147672 | A1* | 5/2016 | Atzmon | G06F 12/1441 711/163 |
| 2016/0170910 | A1* | 6/2016 | Inamdar | H04L 49/901 711/163 |

FOREIGN PATENT DOCUMENTS

| | | |
|---|---|---|
| CN | 102567245 | 7/2012 |
| CN | 102592083 A | 7/2012 |
| CN | 106326130 A | 1/2017 |
| WO | WO 2017/028642 A1 | 2/2017 |

OTHER PUBLICATIONS

International Search Report issued in related International Application No. PCT/CN2018/121184, dated Mar. 27, 2019 (2 pgs.).
International Written Opinion in related International Application No. PCT/CN2018/121184, dated Mar. 27, 2019 (2 pgs.).
First Office Action issued by the State Intellectual Property Office of People's Republic of China, dated Oct. 8, 2019, issued in corresponding Chinese Application No. CN 201711344559 (15 pages).
Chinese Search Report dated Sep. 19, 2019, issued corresponding Chinese Application No. CN 201711344559 (1 pages).

* cited by examiner

MEMORY PROTECTIVE APPARATUS FOR INDIRECT ACCESS MEMORY CONTROLLER

CROSS-REFERENCE TO RELATED APPLICATIONS

This application is a national stage filing under 35 U.S.C. § 371 of International Application No. PCT/CN2018/121184, filed on Dec. 14, 2018, and published as WO 2019/114820 A1, which claims the benefits of priority to Chinese application number 201711344559.6, filed Dec. 15, 2017, both of which are incorporated herein by reference in their entireties.

BACKGROUND

With the rapid development of the mobile Internet and the Internet of Things, chip security becomes increasingly important. Generally, security chip software requires a chip to support a trusted realm and an untrusted realm. The trusted realm has independent hardware resources. A system places sensitive and important data in the resources of the trusted realm. Regular data and applications are placed in the untrusted realm, and the untrusted realm cannot access the resources of the trusted realm. These requirements need hardware support, such as interrupt protection, peripheral protection, and memory protection, of which memory protection is an extremely important part.

There are many conventional protective apparatuses for direct access memories, such as memory protection units for RAMs. This type of protection apparatuses can avoid an unauthorized access by merely authenticating the address on the bus (which also acts as an access address of a memory unit). Some other memories, however, cannot be accessed by directly using bus addresses; instead, a memory access address first needs to be set in a specific register of a memory controller and then the memory controller such as a flash controller is triggered to access the memory.

SUMMARY OF THE DISCLOSURE

Embodiments of the present disclosure provides a protective apparatus for an indirect access memory controller. The protective apparatus can include: a bus monitoring unit configured to monitor a bus address and detect an operation type of access conducted by a bus on the indirect access memory controller; a window register unit configured to store operation addresses of different access types; an permission list unit configured to partition memory space into several virtual memory protection areas and independently set an access permission attribute (e.g., readable, writable or erasable) for each memory area; and an unauthorized operation processing unit configured to process a subsequent operation performed when a permission violating access occurs.

DETAILED DESCRIPTION

To make the objectives, technical solutions, and advantages of the embodiments of the present disclosure clearer, the technical solutions in the embodiments of the present disclosure are described in the following with reference to the accompanying drawings in the embodiments of the present disclosure. Apparently, the described embodiments are merely some, rather than all, of the embodiments of the present disclosure. Based on the embodiments in the present disclosure, all other embodiments obtained by those of ordinary skill in the art without creative efforts should belong to the protective scope of the present disclosure.

As indicated above, there is a need for protecting indirect access memories. Creating a new memory controller with the desired protection function would increase the workload and extend the chip development cycle. As the chip security becomes increasingly important, there emerges a huge demand for upgrading security functions of common chips and finding ways to accelerate the security upgrading process. To overcome the deficiency of low security of an indirect access memory controller, the present disclosure provides a memory protective apparatus for an indirect access memory controller. Security protection for this type of memory can be implemented by merely adding the memory protective apparatus between a bus and the indirect access memory controller, and a security function can be added to an original memory control module without modifying the indirect access memory controller.

Figure 1:
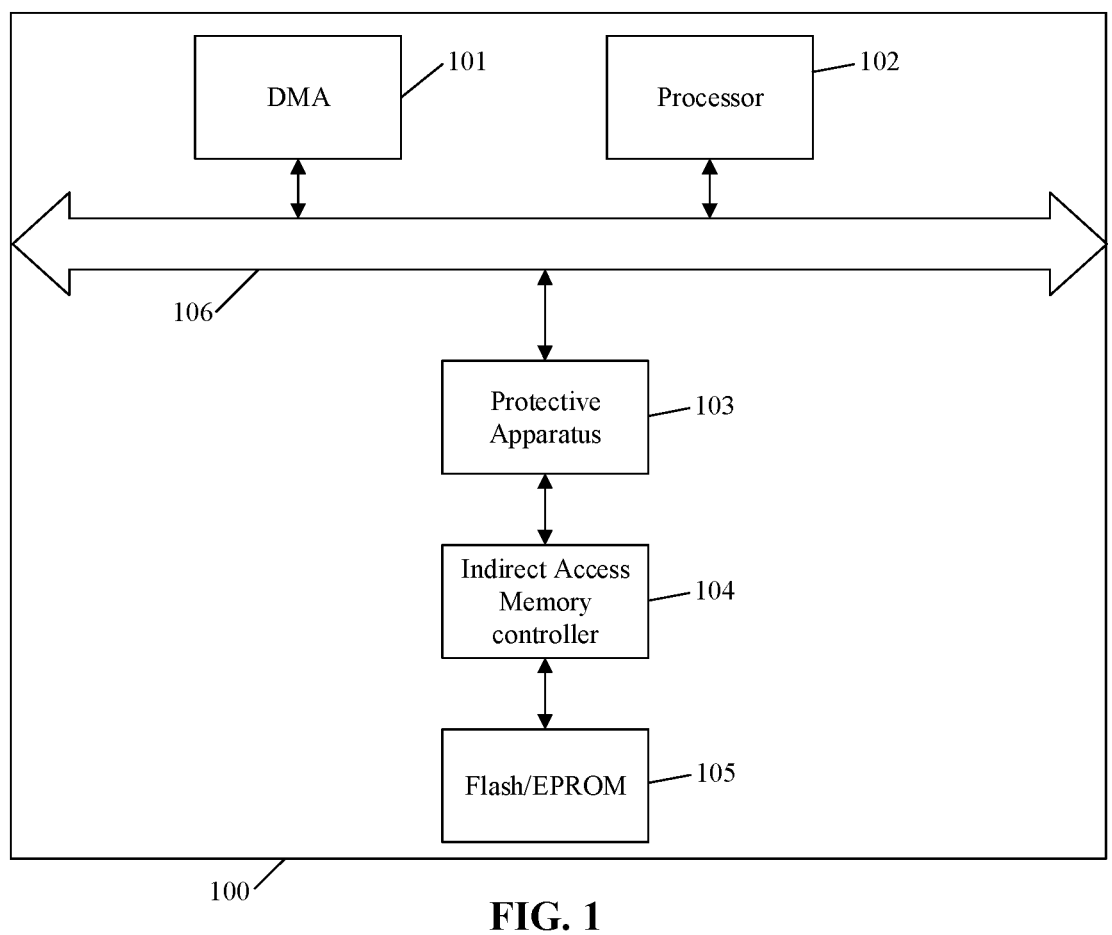
FIG. 1 is a schematic diagram of an exemplary position of protective apparatus in a SOC chip system, according to some embodiments of the present disclosure.

Some embodiments of the present disclosure provide an apparatus for adding a protection function for an indirect access memory controller. FIG. 1 is a schematic diagram of a position of the protective apparatus in an SOC chip system 100. As shown in FIG. 1, SOC chip system 100 can include direct memory access (DMA) 101, processor 102, protective apparatus 103, all of which are connected via bus 106. In the embodiments of the present disclosure, indirect access memory can use protective apparatus 103 when attempting to access indirect access memory controller 104 and memory 105.

Figure 2:
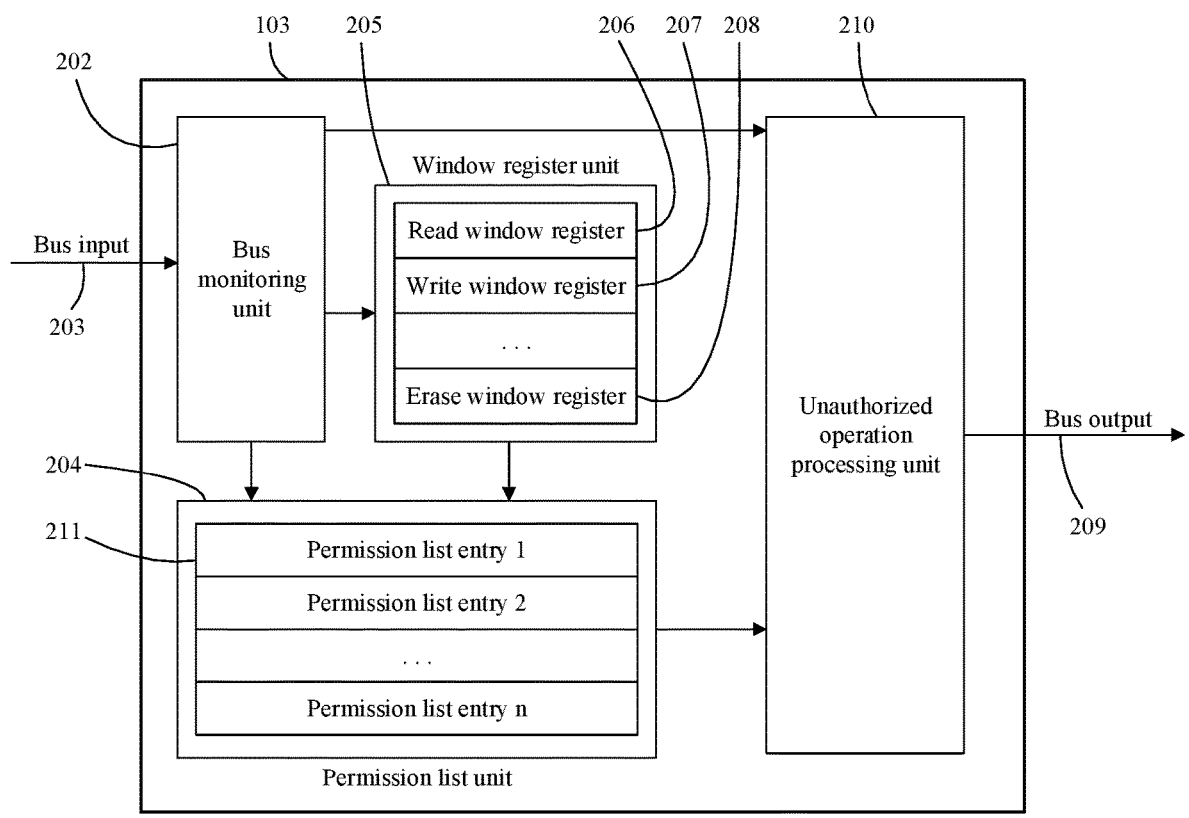
FIG. 2 is an exemplary diagram showing connection relations between each of the components of the protective apparatus, according to some embodiments of the present disclosure.

FIG. 2 is a diagram showing connection relations between each of the components of protective apparatus 103, according to some embodiments of the present disclosure. Referring to FIG. 2, protective apparatus 103 comprises a bus monitoring unit 202, a window register unit 205, a permission list unit 204, and an unauthorized operation processing unit 210.

Bus monitoring unit 202 is configured to monitor a bus address and detect an operation type of a bus accessing indirect access memory controller 104, to update a corresponding window register of window registers 206-208 if the operation type is a window register operation, to initiate permission authentication if the operation type is a register controlling operation, and to perform list entry configuration if the operation type is a permission list configuration operation.

Window register unit 205 is configured to store operation addresses of different access types in window registers 206-208.

Permission list unit 204 is configured to partition a memory space, such as flash memory 105, into several virtual memory protection areas, and independently set an access permission attribute for each memory area.

Unauthorized operation processing unit 210 is configured to process a subsequent operation performed after a permission violating access occurs.

Further, in some embodiments, when a memory is accessed through an indirect access memory controller, the memory controllers, such as some low-speed flash controllers, E2PROM (Electrically Erasable Programmable Read-only Memory) controllers, indirect access DDR (Double Data Rate) controllers, etc., can be triggered to access the memory only after a target address is first stored into a window register of window registers 206-208 specified by the controller and then a corresponding trigger register in the controller is configured.

In some embodiments, configuration of protective apparatus 103 may be enabled only by an access in a privileged state. A specific state is indicated by a permission indicator input bit on a memory access request, and protective apparatus 103 can be enabled and configured only when the input bit is valid. Configuration operations include configuring list entry address ranges and configuring a permission attribute register.

In some embodiments, a corresponding window register of window registers 206-208 is updated after a window register operation has been detected. The corresponding window register includes a read window register 206, a write window register 207 and an erase window register 208. Each operation can have an independent window register respectively, or multiple operations can share the same window register.

In some embodiments, in bus monitoring unit 202, a bus value is transmitted to a corresponding permission list entry 211 in the permission list unit 204 after detecting a permission list configuration operation. Permission list configuration operations can include configuring a security address range or a permission attribute.

In some embodiments, when bus 106 attempts to perform an operation (e.g., read, write, erase, etc.) on memory 105, bus 106 sends a memory access request to configure operation addresses of different access types, which are stored in window register unit 205. Bus monitoring unit 202 then detects the request as a register controlling operation. After detecting a register controlling operation, bus monitoring unit sends a bus address within the memory access request to permission list entry 211 for authentication. In addition, window register unit 205 sends an access type of a corresponding window register as an address to the permission list entry 211 as a part of the authentication.

Figure 3:
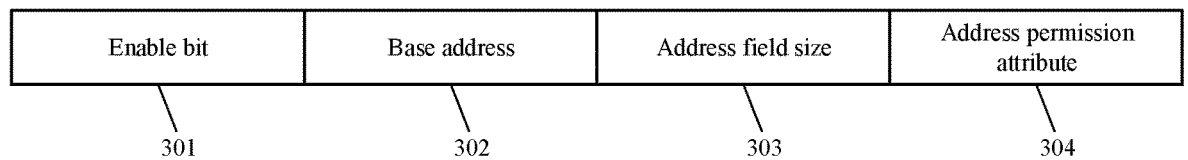
FIG. 3 is a schematic diagram of exemplary content of a permission list entry, according to some embodiments of the present disclosure.

Referring to FIG. 3, permission list unit 204 includes one or more list entries, and each list entry 211 includes the following content: list entry enable bit 301, base address 302, address field size 303, and permission attribute 304. List entry enable bit 301 indicates whether the list entry is valid. Base address 302 and address field size 303 represents an address range protected by list entry. Permission attribute 304 represents a permission of the address field, for example, whether it is readable, writable, erasable, etc.

Referring back to FIG. 2, bus monitoring unit 202 transmits memory access requests into permission list unit 204. Permission list unit 204 receives a bus address within the memory access request and the access type from window register unit 205, evaluates the bus address according to permission list entries 211 and the access type, and determines from permission list entries 211 a permission attribute 304 that corresponds to the bus address. If the memory access request violates permission attribute 304, a permission violating access occurs, and unauthorized processing unit 210 can perform one, two, or all of the following processing: (1) returning a bus error; (2) sending out an indicator signal such as an interrupt; and (3) invalidating the memory access request without any other processing.

In some embodiments, the protective apparatus 103 further includes a global enable register configured to indicate that protective apparatus 103 enables the protection function.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Specific implementations of the present disclosure are described above, but the protective scope of the present disclosure is not limited to the specific embodiment. Any modification, equivalent replacement and improvement made without departing from the spirit and principle of the present disclosure should fall within the protection scope of the present disclosure.

The invention claimed is:

1. A protective apparatus for an indirect access memory controller associated with a memory, comprising:
   a bus monitoring unit configured to monitor a memory access request having a bus address and to detect a register controlling operation;
   a window register unit configured to receive an operation address from the bus monitoring unit based on the register controlling operation and to select an access type of different access types based on the received operation address; and
   a permission list unit configured to receive the bus address from the bus monitoring unit and the selected access type from the window register unit and to authenticate the bus address by evaluating the bus address according to a permission list and selected access type and determining from the permission list a permission attribute that corresponds to the bus address,
   wherein the memory access request includes a permission indicator input bit that enables configuring the protective apparatus, and wherein configuring the protective apparatus comprises configuring list entry address ranges of the permission list or a permission attribute register of the permission list and is enabled when the permission indicator input bit is valid.

2. The protective apparatus of claim 1, further comprising an unauthorized operation processing unit configured to process a subsequent operation performed when a permission violating access occurs, wherein the permission violating access is determined by the permission list unit based on the authentication.

3. The protective apparatus of claim 2, wherein the unauthorized operation processing unit is configured to, in response to a memory access request having the bus address violating the access permission, return a bus error, send out an indicator signal, or invalidate the memory access request without any other processing.

4. The protective apparatus according to claim 1, wherein the permission list unit is configured to partition a memory space of the memory into several virtual memory protection areas and to set an access authority attribute for each memory area.

5. The protective apparatus according to claim 1, wherein when the memory is accessed through the indirect access memory controller, the indirect access memory controller is triggered to access the memory when a target address is first stored into a window register specified by the controller and then a corresponding trigger register in the controller is configured.

6. The protective apparatus according to claim 1, wherein the bus monitoring unit is further configured to, after detecting a window register operation, update a corresponding window register in the window register unit.

7. The protective apparatus according to claim 6, wherein the corresponding window register comprises a read window register, a write window register or an erase window register.

8. The protective apparatus according to claim 1, wherein the bus monitoring unit is configured to, after detecting a permission list configuration operation, transmit a bus value to a corresponding permission list entry in the permission list unit.

9. The protective apparatus according to claim 8, wherein the bus value includes a security address range or a permission attribute.

10. The protective apparatus according to claim 1, wherein the protective apparatus is further configured to, after the bus monitoring unit detects a register controlling operation, input a window address information as an address to a permission list entry in the permission list unit for authentication.

11. The protective apparatus according to claim 1, wherein the permission list comprises one or more permission list entries having the following content: a list entry enable bit, a base address, an address field size, and a permission attribute; the list entry enable bit indicates whether the list entry is valid; the base address and address field size represent an address range protected by the list entry; and the permission attribute represents the permission of the address field.

12. The protective apparatus according to claim 1, further comprising a global enable register configured to represent an enablement of the protection function.

13. A system comprising:
a memory;
an indirect access memory controller associated with the memory; and
a protective apparatus communicatively coupled to the indirect access memory controller and comprising:
a bus monitoring unit configured to monitor a memory access request having a bus address and to detect a register controlling operation;
a window register unit configured to receive an operation address from the bus monitoring unit based on the register controlling operation and to select an access type of different access types based on the received operation address; and
a permission list unit configured to receive the bus address from the bus monitoring unit and the selected access type from the window register unit and to authenticate the bus address by evaluating the bus address according to a permission list and selected access type and determining from the permission list a permission attribute that corresponds to the bus address,
wherein the memory access request includes a permission indicator input bit that enables configuring the protective apparatus, and wherein configuring the protective apparatus comprises configuring list entry address ranges of the permission list or a permission attribute register of the permission list and is enabled when the permission indicator input bit is valid.

\* \* \* \* \*

UNITED STATES PATENT AND TRADEMARK OFFICE
CERTIFICATE OF CORRECTION

| | |
|---|---|
| PATENT NO. | : 11,216,192 B2 |
| APPLICATION NO. | : 16/479532 |
| DATED | : January 4, 2022 |
| INVENTOR(S) | : Peng Jiang et al. |

It is certified that error appears in the above-identified patent and that said Letters Patent is hereby corrected as shown below:

On the Title Page

Item (57), Line 4, "set a access" should read --set an access--.

Signed and Sealed this
Third Day of October, 2023

Katherine Kelly Vidal
*Director of the United States Patent and Trademark Office*